July 24, 1973  A. GEROSA ETAL  3,748,230
FUEL ELEMENT FOR FAST REACTORS WITH A DEVICE
FOR EXHAUSTING THE FISSION GASES THEREFROM
Filed Aug. 6, 1969  5 Sheets-Sheet 1

INVENTORS
A. Gerosa and M. Martini
BY
Richards & Geier
ATTORNEYS

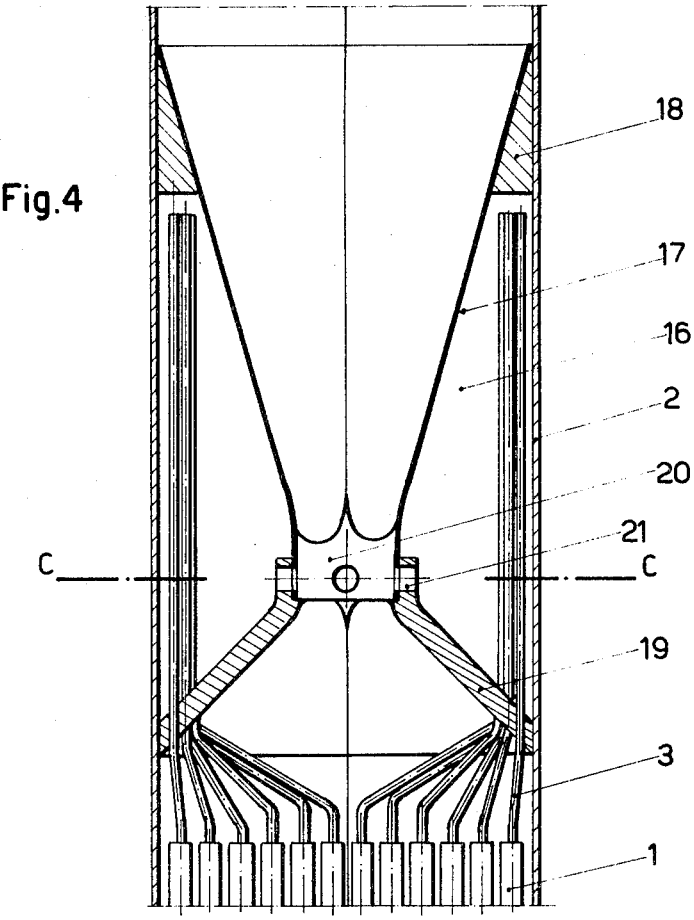
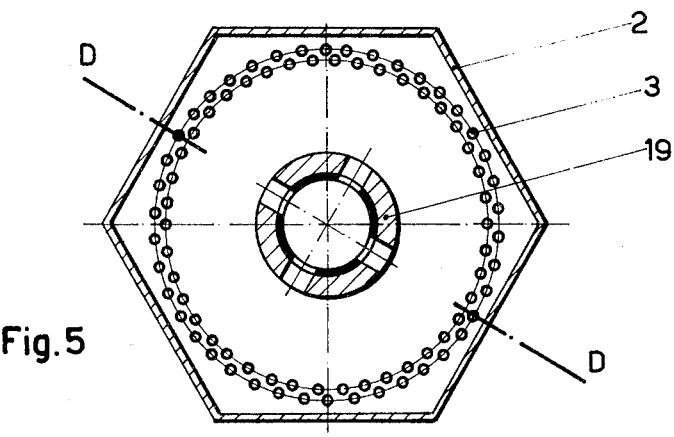

INVENTORS
A. Gerosa and M. Martini
BY
Richards & Geier
ATTORNEYS

July 24, 1973  A. GEROSA ETAL  3,748,230
FUEL ELEMENT FOR FAST REACTORS WITH A DEVICE
FOR EXHAUSTING THE FISSION GASES THEREFROM
Filed Aug. 6, 1969                        5 Sheets-Sheet 5
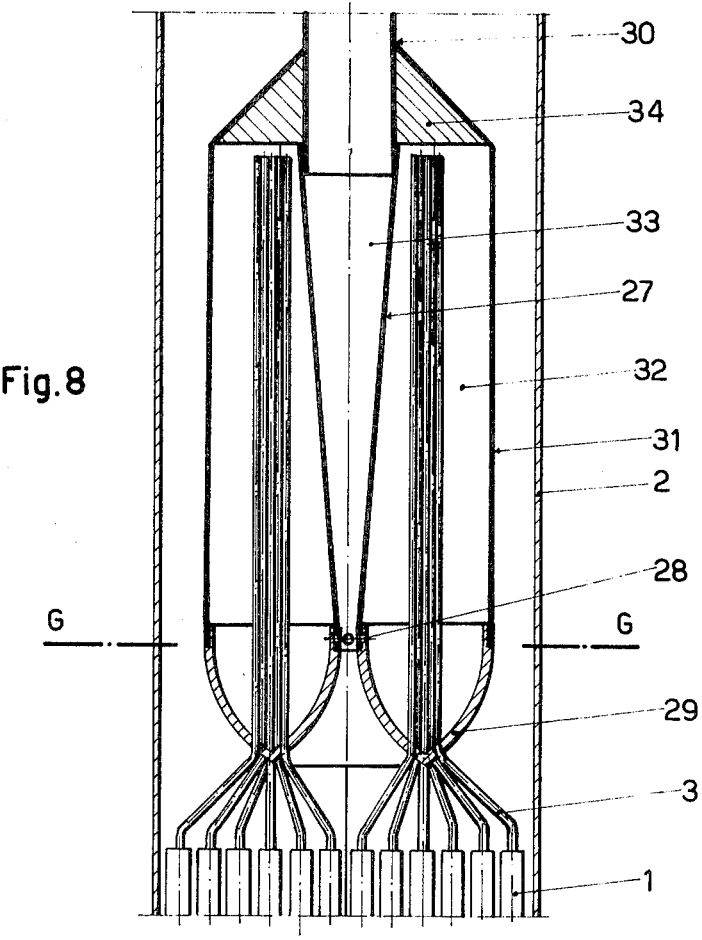
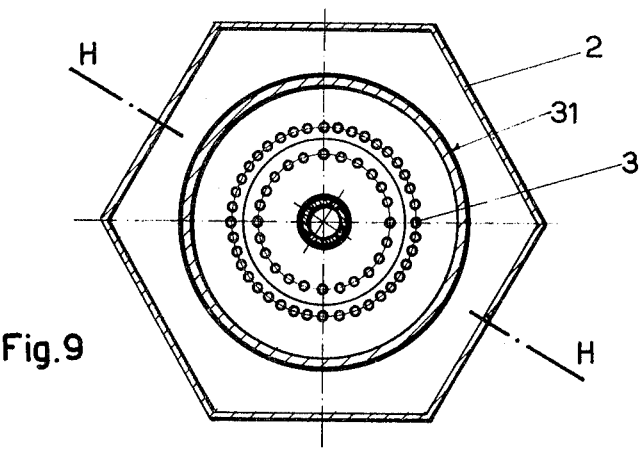
INVENTORS
A. Gerosa and M. Martini
BY
Richards & Geier
ATTORNEYS

United States Patent Office

3,748,230
Patented July 24, 1973

3,748,230
FUEL ELEMENT FOR FAST REACTORS WITH A DEVICE FOR EXHAUSTING THE FISSION GASES THEREFROM
Augusto Gerosa and Marco Martini, Rome, Italy, assignors to Comitato Nazionale per l'Energia Nucleare, Rome, Italy
Filed Aug. 6, 1969, Ser. No. 847,829
Claims priority, application Italy, Aug. 20, 1968, 39,198/68, Patent 845,291
Int. Cl. G21c 3/34
U.S. Cl. 176—78                        6 Claims

ABSTRACT OF THE DISCLOSURE

The invention provides a means for exhausting the fission gases from the rods of a nuclear reactor fuel element while preventing the coolant from reaching the inside of the rods on any transient conditions of the reactor. Said means comprises a vertically elongated chamber which is superimposed to the fuel element and is sealed at its top and side walls, a series of apertures being provided only at the lower section of it at a short distance from the top end of the fuel element rods which apertures communicate the inside of the chamber with the surrounding space where the coolant stream of the reactor flows upwards. Each fuel rod is provided with a very thin tube connecting the top section of the rod with the top section of said chamber the profile of the side wall of the latter may be chosen in such a way that a suction is applied to said apertures by the coolant stream which suction at least partially compensates for any increase of pressure on the same apertures due to an increase of frictional losses downstream of the chamber whenever there is an increase of the flow speed of the coolant.

---

Figure 1:
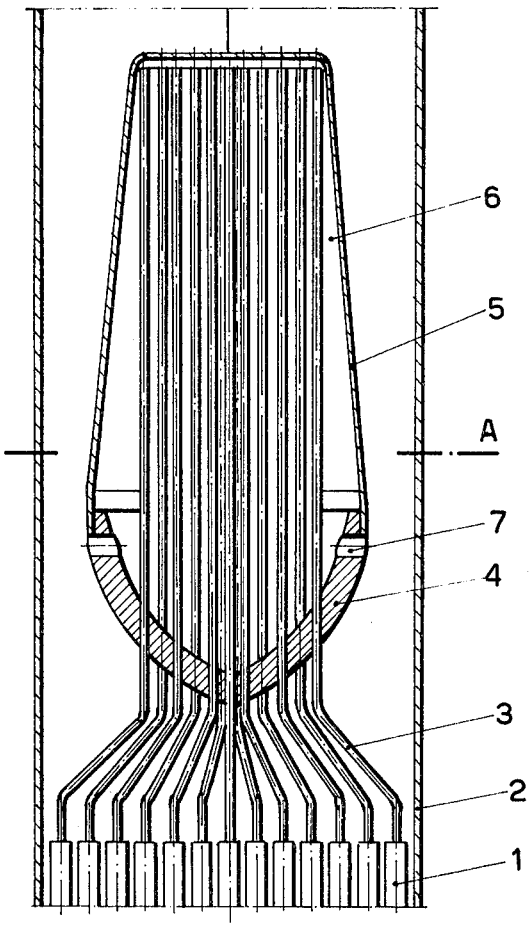

The present invention relates in general to nuclear reactors and in particular to fuel elements consisting of bundles of rods, which elements are provided with a relief device of the gaseous fission products and are usable mainly in liquid-metal cooled fast reactors.

As is well known, in the liquid-metal cooled fast reactors, fuel elements are used which comprise a bundle of rods, each rod consisting of the fuel material (in particular ceramic fuel) contained in a metal tube the function of which is for supporting and containing the fuel material and for protecting the coolant against it.

The fission products released from the irradiated fuel may be retained within the rod tube or released in good part by a suitable means.

In the first case, such rods are employed which are sealed at their ends; this solution involves characteristic safety and economy problems affecting both the nuclear plant and the fabricating and reprocessing cycles of the fuel elements.

In the second case several solutions have been suggested namely: solutions whereby the fission released gases, through suitable systems are directly led to the cover gas and/or to a suitable purifying and draining system; solutions whereby the released gases are removed by means of the coolant which conveys them in the greatest part to the covering gas.

The last mentioned solutions include the class of devices adapted for a single rod and the class of devices adapted for a whole bundle of rods; in developing both said devices, various artifices are applied with the aim mainly of removing or lessening the hazards which may arise as a consequence of the fuel coming to direct contact with the liquid-metal coolant.

The solutions up to now suggested consist mainly of suitable valves to be applied to the rod ends, which valves in normal conditions prevent liquid metal from entering the rod, but allow the escape of the released gases whenever their pressure within the rod is greater than the coolant pressure; said valves being designed to meet as far as practicable the dimensional and operational requirements of the reactor.

Said valves may be hydraulically or mechanically operated or their operation may be based upon capillarity etc.

However all of these differently operated valves, even when adapted for solving the aforementioned problem, are affected by some drawbacks when considered from the following standpoints:

(a) plant contamination;
(b) liability to obstruction;
(c) re-entering of sodium into the fuel rods in certain operating conditions of the reactor;
(d) excessive overall length of the element which may badly affect the production cost due to high handling and operating costs of the plant;
(e) resorting to techniques and materials which are not enough proven nor enough well known;
(f) core safety;
(g) applicability to fast reactors with high thermohydraulic performances.

None of the suggested solutions meets the total of the above requirements. It is therefore an object of this invention to provide a device whereby all of the above problems are simultaneously solved in a satisfactory way.

This device is remarkably safe from the point of view of its liability to obstructions of the gas outlets; it is also capable of preventing the sodium coolant from re-entering into the rod in all the operating conditions whenever this becomes a requirement while the overall length of the element is compabale with that in other solutions; furthermore, the release of the fission gases in an area downstream of the core such that the gas flow does not cause any disturbances of the thermohydraulic steady state of the core.

This device has a simple structure; it can be applied also to those reactors wherein the hydraulic losses across the core are high; it aids even in reducing such losses. This device does not contemplate any fluidtight interconnections among the rods of a bundle and therefore the elements are more readily assembled if compared with the known devices; furthermore, in case of one rod failing, the liquid metal does not penetrate into the remaining rods of the bundle. Lastly with regards to contaminations, by the device of this invention, the outflow of the fission products is retarded in such a way as to substantially concur to the long term reduction of the fission products activity into the coolant within safe limts.

The device of this invention comprises a space which is provided at the top of the rod bundle; a plurality of small tubes whereby the released fission gases are conveyed towards the upper section of said space and means for conveying the same gases from the lower section of said space to the outside thereof.

Figure 2:
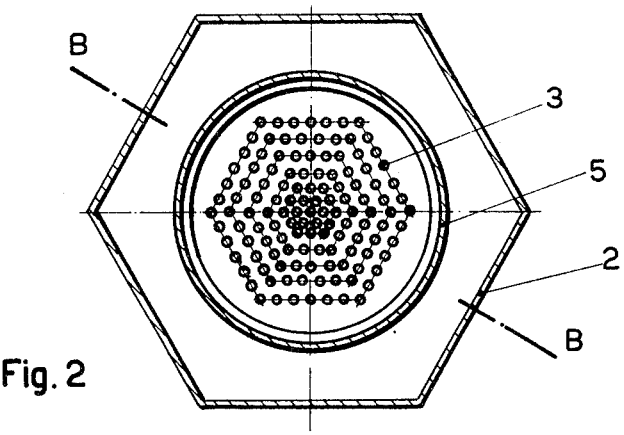
Figure 3:
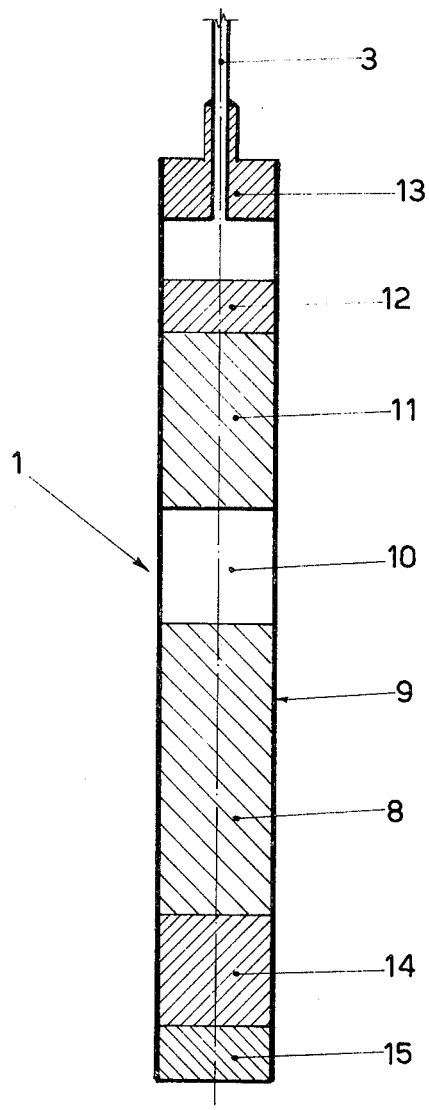
Figure 6:
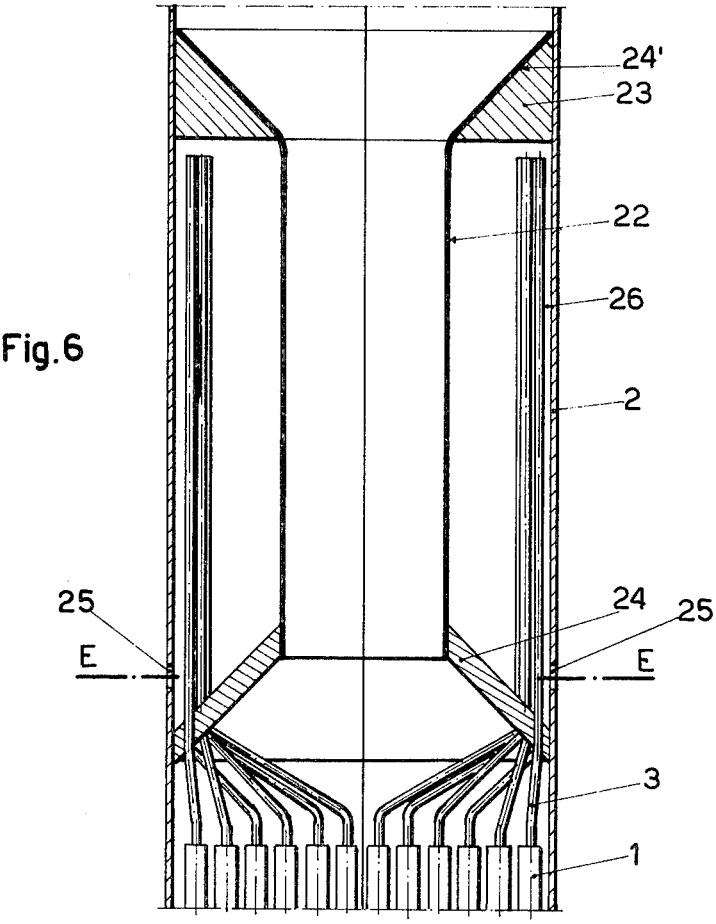
Figure 7:
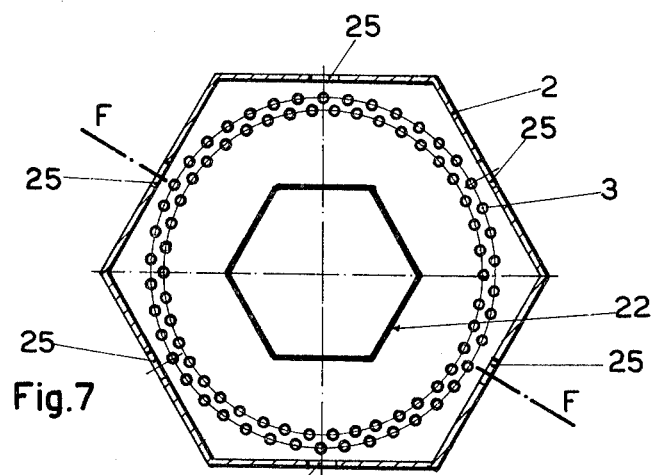

The invention will be more readily understood by consideration of the following description and of the attached drawings which illustrate a few preferred embodiments thereof. In the drawings:

FIG. 1 illustrates a fuel element assembly including the device of this invention;
FIG. 2 shows a cross-section of the fuel element of FIG. 1;
FIG. 3 shows a vertical cross-section of a fuel rod of this invention;
FIGS. 4, 6 and 8 illustrate three alternative embodiments in addition to that in FIGS. 1 and 2;

FIGS. 5, 7 and 9 show respectively a cross-section of the fuel element of FIGS. 4, 6 and 8.

With reference to FIG. 3, fuel rod 1 according to this invention comprises a metal tube 9 wherein the fuel 8 is contained. Above fuel 8 there is a space 10 for allowing the fuel expansion and for receiving the condensed fission products thereinto. A section of fertile material 11 and a porous medium partition are superimposed to fuel section 8. The upper end of tube 9 is connected to a capillary tube 3 by means of an adapter plug 13. Below the fuel section there is another section of fertile material 14 and a plug 15 which is sealed by welding it to tube 9. Also plug 13 may be welded to tube 9 and capillary tube 3.

As shown in FIG. 1, fuel rods 1 are enclosed within a hexagonal duct 2 and at their upper ends communicate with as many capillaries 3 which extend through a perforated grid 4 and into a gas collecting chamber 6 wherein they reach almost to the ceiling of the chamber.

Tubes 3 interconnect the fuel mass within rods 1 with the upper section of chamber 6 which is provided with a plurality of apertures 7 at the area where grid 4 joins the walls of chamber 5.

The outer surfaces of chamber 6 and grid 4 and the inner surface of duct 2 define a space through which the coolant flows. Because the cross-sections at the different heights of said space have different areas, the speed of the uprising flow is different at the different cross-sections. In particular, at the maximum cross-section of chamber 6, that is at the area where grid 4 joins the peripheral walls of chamber 6, the speed of the uprising coolant flow is at a maximum.

The refrigerant flow through the space defined by the outer wall of chamber 6 and the inner surface of duct 2 is subject to changes during the reactor operation. When the flow speed increases there will be also an increase of the frictional losses along duct 6 downstream of port 7, and as a consequence, an increase of pressure on ports 7.

Now according to an aspect of this invention, such an increase of pressure on ports 7 may be partially compensated for by the venturi effect obtained through a proper design of the outer profile of chamber 6. Such compensation is in fact automatically being produced by the same flow speed increase which causes the frictional loss decrease.

The operation of the device of this invention at its steady state is as follows with reference to FIGS. 1, 2 and 3. The gases released by the fuel as a consequence of the irradiation, after passing through sections 10, 11, 12 and therefore after having been partially purified, are led to the upper section of chamber 6 by means of capillaries 3 with which each rod is provided. Any coolant within chamber 6 is first driven out of it through apertures 7 by the incoming gases. Subsequently the gases themselves outflow from chamber 6 through apertures 7 and are conveyed by the coolant towards a suitable area of the cooling system where means are provided for separating the gases from the cooling liquid.

In transient conditions any increase of the liquid metal pressure at apertures 7 and/or any simultaneous decrease of temperature of the fission gases contained in chamber 6 and in the inner spaces of rods 1 cause the coolant to re-enter into chamber 6 through apertures 7 until an equilibrium condition is again attained of the inner and outer pressure at apertures 7. Chamber 6 is so designed that, in any predictable transient conditions, the coolant level within the chamber will never reach to the upper ends of the capillaries 3. Therefore in no condition is the liquid coolant allowed to reenter into the rods.

The device of this invention according to a second embodiment thereof is illustrated in FIGS. 4 and 5, the main difference with respect to the first embodiment of FIGS. 1 and 2 being in the fact that chamber 16 wherein the released gases are collected is defined at its sides by the wall of duct 2 (which while being in general of hexagonal cross-section may have a different cross-section along its length corresponding to chamber 16); at its top by a wedge-shaped seal 18; at its bottom by a wall 19 which is frustoconical provided with a plurality of holes for leaving the capillary tubes to pass through the mouth of the funnel facing downwards. A second frustoconical wall 17 with its larger base facing upwards is joined to said frustoconical bottom and a row of apertures is provided all around the joining area. Frustoconical walls 17, 19 define at their inside a venturi tube through which the coolant which comes from the rod bundle is led to flow. Due to this flow a suction is applied at the apertures 21 and at steady state of the reactor the released gases are drawn from chamber 16 and mixed to the coolant stream flowing through constriction 20.

The device of this invention according to a third embodiment thereof is illustrated in FIGS. 6, 7, the main difference with respect to the other embodiments herein described consisting in the fact that chamber 26 for collecting the gases is defined at the inside by a straight wall 22 which may be cylindrical or prismatical; by a first frustoconical wall 24 joined all around the lower end of said straight wall 22 and extending outwardly and downwardly from said straight wall 22 and by a second frustoconical wall 24' extending outwardly and upwardly from the top end of said straight wall 22; said first frustoconical wall 24 being perforated for letting the plurality of capillary tubes 3 pass through. Both frustoconical walls 24, 24' at their outer periphery are welded to the inner surface of the duct so as to make a sealed joint therewith. A structural element in the form of a ring 23 with wedge-like cross-section is provided for strengthening and ensuring the lightness of the joint between duct 2 and the inner wall 24' at the top section of the latter. A plurality of equally spaced apertures 23 are provided all around duct 2 at a level corresponding to the lower section of chamber 26.

The operation of the above third embodiment of the invention is again similar to the other embodiments but for the fact that the released gases outflow from chamber 26 through apertures 25 and are removed therefrom by the coolant which flows outside of duct 6 and not by that flowing within duct 6.

A fourth embodiment of this invention is illustrated by FIGS. 8 and 9. According to this embodiment, chamber 32 for collecting the fission gaseous products has a toroidal form being generated by the rotation of a plane figure about the vertical axis of duct 2, which figure comprises a straight vertical line which is the outer side of the figure, an ogival downwardly pointing line 29 at the bottom, an inclined straight line sloping upwardly and outwardly which is the inner side of the figure and a horizontal straight line joining the upper ends of said two straight lines 31, 27. By these configurations two passages are provided for the coolant flow: one is between the wall of duct 2 and the outer wall of chamber 32; the other passage 33, which has the profile of a venturi tube, is defined by the inner wall of chamber 32. A row of apertures 28 is provided at the narrowest section of passage 33 which connect the same with the inside of chamber 32. A plurality of holes are provided at the bottom of the lower section of chamber 32 for introducing the capillary tubes into the same chamber.

The operation of the device according to the fourth embodiment is again similar to the first embodiment; however it differs from it in that the fission gaseous products outflow from chamber 32 through apertures 28 and are removed by the small portion of the coolant which flows through the inner passage 33. The latter by means of a tube 30 communicates with an area of the cooling system where the gases are separated from the liquid coolant. By the artifice of discharging the fission gases into a portion only of the cooling stream, the separation of said gases from the liquid coolant in said area of the cooling system is greatly simplified because a limited amount of liquid-gas mixture is to be processed.

What we claim is:

1. In a fuel element of a nuclear reactor of the type which is cooled by an uprising coolant stream of liquid metal, said element comprising a bundle of sealed fuel rods, a thin-walled open ended shroud surrounding said bundle and a venting device, wherein said device is a device for venting to the coolant stream the fission product gases from said element, said device comprising a vertically elongated chamber located above said bundle and having a top, bottom, and side walls having openings located at a lower portion thereof for communicating with the coolant stream, said top, bottom, and side walls being gastight except for said openings, and a bundle of capillary tubes extending vertically through bottom of said chamber along its length, the number of tubes in the last-mentioned bundle being equal to the number of fuel rods in the first-mentioned bundle, said tubes having upper open ends located in an upper portion of said chamber above said openings which during the entire operation of the reactor is constantly free from the liquid coolant stream, said tubes having opposite ends each of which is connected to communicate with the interior of a separate fuel rod, the outer surface of said chamber and the inner surface of said shroud defines a space through which the coolant flows wherein the speed of the uprising coolant flow is different at the different cross-sections wherein said flow is maximum at the opening of said chamber.

2. In combination with the device of claim 1, a fuel rod comprising in combination with sections of fissile and fertile material, a bed of filtering medium capable of removing all solid particles having dimensions greater than the inner size of said capillary tubes.

3. The device of claim 1 wherein said chamber has a vertically elongated form with metal walls which are joined one to the other by gastight joints such as welded joints; the transverse dimension of said chamber being less than the transverse dimension of the rod bundle; whereby an annular space is formed between the chamber and the duct walls; the upper section of said chamber being in the form of a thin walled truncated cone of which the upper smaller base is blind and the lower larger base is totally open and is welded along its periphery to the cuplike bottom of the chamber whereby all around the joining area of said upper and lower sections of the chamber a restriction is provided of said annular space and an increase is produced of the coolant speed; said openings forming a row of apertures all around said joining area whereby a suction is produced through said apertures by the coolant ascending stream.

4. The device of claim 1, wherein said chamber is defined peripherally by said thin walled duct and interiorly by the walls of two hollow truncated cones coaxial with the rod bundle which cones are joined at their smaller bases and wherein said openings form a plurality of apertures at the periphery of the joining area of said truncated cones whereby the coolant stream flowing through said cones is speeded up and a suction is applied on said apertures.

5. The device of claim 1 wherein said chamber is defined peripherally by said thin walled duct and interiorly by a thin walled circular cylinder at the ends of which two hollow truncated cones are attached by their respective small bases, their larger bases being bonded at the periphery thereof to the walls of said duct; and said openings comprise a series of apertures through the duct walls at the level of the lower section of said chamber.

6. The device of claim 1 wherein said chamber has a toroidal form generated by the rotation of a plane figure about the axis of said duct, which figure comprises an outer straight vertical side at a distance from the duct wall, an inner straight side inclined upwardly and outwardly which sides are connected at their top ends by a straight horizontal line and at the bottom ends by an ogival line pointing downwards, whereby two passages are defined for the coolant stream; one of which is between the wall of said duct and the outer wall of said chamber, and the other is within the inner wall of the same chamber; a row of apertures being provided at the narrowest section of the latter mentioned passage for connecting this to the inside of said chamber.

References Cited
UNITED STATES PATENTS

| | | | |
|---|---|---|---|
| 3,010,889 | 11/1961 | Fortescue et al. | 176—19 |
| 3,196,083 | 7/1965 | Hosegood et al. | 176—37 |
| 3,252,869 | 5/1966 | Koutz | 176—37 X |
| 3,357,893 | 12/1967 | Gatley et al. | 176—37 X |
| 3,432,388 | 3/1969 | Fortescue | 176—78 X |
| 3,441,478 | 4/1969 | Williams | 176—37 X |
| 3,454,468 | 7/1969 | Franco-Ferreira | 176—37 X |

CARL D. QUARFORTH, Primary Examiner

G. G. SOLYST, Assistant Examiner

U.S. Cl. X.R.

176—37, 76